US007236750B2

(12) United States Patent
Vaidyanathan et al.

(10) Patent No.: US 7,236,750 B2
(45) Date of Patent: Jun. 26, 2007

(54) TECHNIQUES FOR CORRECTING FOR PHASE AND AMPLITUDE OFFSETS IN A MIMO RADIO DEVICE

(75) Inventors: Chandra Vaidyanathan, Bethesda, MD (US); Gary L. Sugar, Rockville, MD (US)

(73) Assignee: IPR Licensing Inc., Wilmington, DE (US)

( * ) Notice: Subject to any disclaimer, the term of this patent is extended or adjusted under 35 U.S.C. 154(b) by 500 days.

(21) Appl. No.: 10/859,255

(22) Filed: Jun. 2, 2004

(65) Prior Publication Data

US 2004/0219892 A1 Nov. 4, 2004

Related U.S. Application Data

(63) Continuation-in-part of application No. 10/457,293, filed on Jun. 9, 2003, now Pat. No. 7,031,669.

(60) Provisional application No. 60/409,677, filed on Sep. 10, 2002.

(51) Int. Cl.
*H04B 1/40* (2006.01)
(52) U.S. Cl. .................. 455/84; 455/562.1; 455/67.16; 455/304; 455/278.1; 455/101; 455/103; 455/276.1; 342/373; 342/383; 343/703; 343/729; 375/317; 375/347; 375/219
(58) Field of Classification Search .................. 455/84, 455/562.1, 67.16, 278.1, 101, 103, 276.1; 342/383; 375/317, 347, 295, 219
See application file for complete search history.

(56) References Cited

U.S. PATENT DOCUMENTS 4,166,274 A * 8/1979 Reudink et al. ............ 342/376

(Continued)

FOREIGN PATENT DOCUMENTS

WO WO 95/34103 12/1995

OTHER PUBLICATIONS

Wennstrom et al., "Auto-Calibrating Adaptive Array for Mobile Telecommunications," IEEE Transactions on Aerospace and Electronic Systems, V.36, No. 2, Apr. 2000.

(Continued)

*Primary Examiner*—Marceau Milord
(74) *Attorney, Agent, or Firm*—Volpe and Koenig, P.C.

(57) ABSTRACT

Techniques to correct for phase and amplitude mismatches in a radio device in order to maintain channel symmetry when communicating with another device using MIMO radio communication techniques. Correction for the amplitude and phase mismatches among the plurality of transmitters and plurality of receivers of a device may be made at baseband using digital logic (such as in the modem) in the receiver path, the transmitter path or both paths of that device. In a device, amplitude and phase offsets are determined among the plurality of radio transmitter and radio receiver paths by measuring phase and amplitude responses when supplying a signal to a transmitter in a first antenna path of the device and coupling the radio signal from a first antenna to a second antenna path of that device where the signal is downconverted by a receiver associated with the second antenna path, and similarly coupling a signal from the second antenna path to the first antenna path. Measurements are obtained between the first antenna path and each of the other antenna paths when coupling a signal in both directions between them. Phase and amplitude offset correction values are computed from the phase and amplitude measurements during a self-calibration operation or mode of the device, and are used during a run-time operation or mode when processing the baseband transmit and/or receive signals to compensate for the phase and amplitude offsets among the plurality of transceiver paths of a device. Amplitude offset correction may not be necessary (or optional) for certain radio implementations or MIMO radio algorithms. The device may execute the self-calibration mode on device power-up, and then periodically thereafter. Self-calibration may also be performed at the factory on a device.

7 Claims, 8 Drawing Sheets

U.S. PATENT DOCUMENTS

| | | | |
|---|---|---|---|
| 5,274,844 A | 12/1993 | Harrison et al. | 455/25 |
| 5,530,449 A | 6/1996 | Wachs et al. | 342/174 |
| 5,543,801 A | 8/1996 | Shawyer | 342/354 |
| 5,546,090 A | 8/1996 | Roy, III et al. | 342/174 |
| 6,037,898 A * | 3/2000 | Parish et al. | 342/174 |
| 6,133,868 A * | 10/2000 | Butler et al. | 342/174 |
| 6,157,340 A * | 12/2000 | Xu et al. | 342/174 |
| 6,195,045 B1 * | 2/2001 | Xu et al. | 342/368 |
| 6,298,092 B1 | 10/2001 | Heath et al. | |
| 6,307,882 B1 | 10/2001 | Marzetta | 375/224 |
| 6,314,147 B1 | 11/2001 | Liang et al. | 375/346 |
| 6,317,466 B1 | 11/2001 | Foschini et al. | 375/267 |
| 6,369,758 B1 * | 4/2002 | Zhang | 342/383 |
| 6,377,636 B1 | 4/2002 | Paulraj et al. | 375/346 |
| 6,377,819 B1 | 4/2002 | Gesbert et al. | 455/562.1 |
| 6,380,910 B1 | 4/2002 | Moustakas et al. | 343/893 |
| 6,442,214 B1 | 8/2002 | Boleskei et al. | 375/299 |
| 6,473,467 B1 | 10/2002 | Wallace et al. | 375/267 |
| 6,687,492 B1 | 2/2004 | Sugar et al. | 455/276.1 |
| 6,785,520 B2 * | 8/2004 | Sugar et al. | 455/101 |
| 6,873,651 B2 * | 3/2005 | Tesfai et al. | 375/219 |
| 7,006,810 B1 * | 2/2006 | Winters et al. | 455/277.1 |
| 7,031,669 B2 * | 4/2006 | Vaidyanathan et al. | 455/84 |
| 2002/0111142 A1 | 8/2002 | Klimovitch | |
| 2003/0050016 A1 | 3/2003 | Boros et al. | 455/67.4 |
| 2004/0048584 A1 | 3/2004 | Vaidyanathan et al. | |

OTHER PUBLICATIONS

Wennstrom et al., "Effects of Finite Weight Resolution and Calibration Errors on the Performance of Adaptive Antenna Arrays," IEEE Transactions on Aerospace and Electronic Systems, V.36, No. 2, Apr. 2001.

Sommerkorn et al., "Uniform Rectangular Antenna Array Design and Calibration Issues for 2-D ESPRIT Application," EPMCC, Feb. 2001.

* cited by examiner

TECHNIQUES FOR CORRECTING FOR PHASE AND AMPLITUDE OFFSETS IN A MIMO RADIO DEVICE

This application is a continuation-in-part of U.S. application Ser. No. 10/457,293, filed Jun. 9, 2003, now U.S. Pat. No. 7,031,669 which in turn claims priority to U.S. Provisional Application No. 60/409,677, filed Sep. 10, 2002. The entirety of each of the aforementioned applications is incorporated herein by reference.

BACKGROUND OF THE INVENTION

The present invention relates to techniques for correcting for the effects of phase and amplitude offsets in radio devices that employ multiple-input multiple-output (MIMO) radio communication.

MIMO radio communication involves simultaneously transmitting a plurality of signals from a first device via corresponding ones of a plurality of antennas and receiving a plurality of signals at a plurality of antennas of a second device. Each device has a plurality of transmitters to upconvert the signals to be transmitted, and a plurality of receivers to downconvert the signals received at each of the plurality of antennas.

Many MIMO signal processing algorithms are known in the art. There are some MIMO radio algorithms that use information about the radio channel between the two devices to maximize the received signal-to-noise ratio (SNR) at each device. These MIMO radio algorithms rely on channel symmetry of the link between the two devices. Examples of MIMO radio algorithms that rely on channel symmetry are disclosed in, for example, commonly assigned U.S. patent application Ser. No. 10/174,728, filed Jun. 19, 2002, entitled "System and Method for Antenna Diversity Using Joint Maximal Ratio Combining," U.S. patent application Ser. No. 10/174,689 filed Jun. 19, 2002, entitled "System and Method for Antenna Diversity Using Equal Power Joint Maximal Ratio Combining," and U.S. patent application Ser. No. 10/064,482 filed Jul. 18, 2002, entitled "System and Method for Joint Maximal Ratio Combining Using Time-Domain Signal Processing." These algorithms substantially increase the received signal-to-noise ratio, and in so doing, extend the range at which devices can communicate with each other.

Channel symmetry is lost if the transmitter and receiver paths of one device on the link are not identical, which degrades the performance of the MIMO radio algorithm. Mismatches in amplitude (gain) and phase responses between the data converters and antennas in each antenna path of a device due to analog circuit non-idealities in the transmitter and receiver for each antenna path may cause the channel response to become asymmetrical.

In order to fully exploit the benefits of MIMO radio algorithms that depend on channel symmetry in the link between the two devices, techniques are needed for correcting for amplitude and phase mismatches in each device on the MIMO radio link. These techniques are also useful when one device on the link has a MIMO radio and the other device has a single antenna or switched diversity antenna system.

SUMMARY OF THE INVENTION

Briefly, techniques are provided to correct for phase and amplitude mismatches (also referred to herein as offsets or imbalances) in a device in order to maintain channel symmetry when communicating with another device using MIMO radio communication techniques that depend on channel symmetry. Correction for the amplitude and phase mismatches among the plurality of transmitters and plurality of receivers of a device may be made at baseband using digital logic (such as in the modem) in the receiver path, the transmitter path or both paths of that device. In a device, amplitude and phase offsets are determined among the plurality of radio transmitter and radio receiver paths by measuring phase and amplitude responses when supplying a signal to a transmitter in a first antenna path of the device and coupling the radio signal from a first antenna to a second antenna path of that device where the signal is downconverted by a receiver associated with the second antenna path, and similarly measuring phase and amplitude responses when coupling a signal from the second antenna path to the first antenna path. Measurements are obtained between the first antenna path and each of the other antenna paths when coupling a signal in both directions between them. Phase and amplitude offset correction values are computed from the phase and amplitude measurements during a self-calibration operation or mode of the device, and are used during a run-time operation or mode when processing the baseband transmit and/or receive signals to compensate for the phase and amplitude offsets among the plurality of transceiver paths of a device. Amplitude offset correction may not be necessary (or optional) for certain radio implementations or MIMO radio algorithms. The device may execute the self-calibration mode on device power-up, and then periodically thereafter. Self-calibration may also be performed at the factory on a device.

When a first device calibrated as described herein communicates with a second device similarly calibrated, the channel response between the digital input (DAC input) of the transmit paths of the first device to the digital output (ADC output) of the receive paths of the second device is symmetrical to the channel response between the digital input (DAC input) of the transmit paths of the second device to the digital output (ADC output) of the receive paths of the first device. Thus, the channel responses between the two devices at the baseband signal processing level are symmetrical, which is desirable for MIMO radio algorithms that depend on channel symmetry.

These techniques are useful for single carrier modulation systems as well as multi-carrier modulation systems, such as an orthogonal frequency division multiplex (OFDM) system.

Advantages of the present invention will become more apparent when reference is made to the following description taken in conjunction with the accompanying drawings.

DETAILED DESCRIPTION OF THE DRAWINGS

Figure 1:
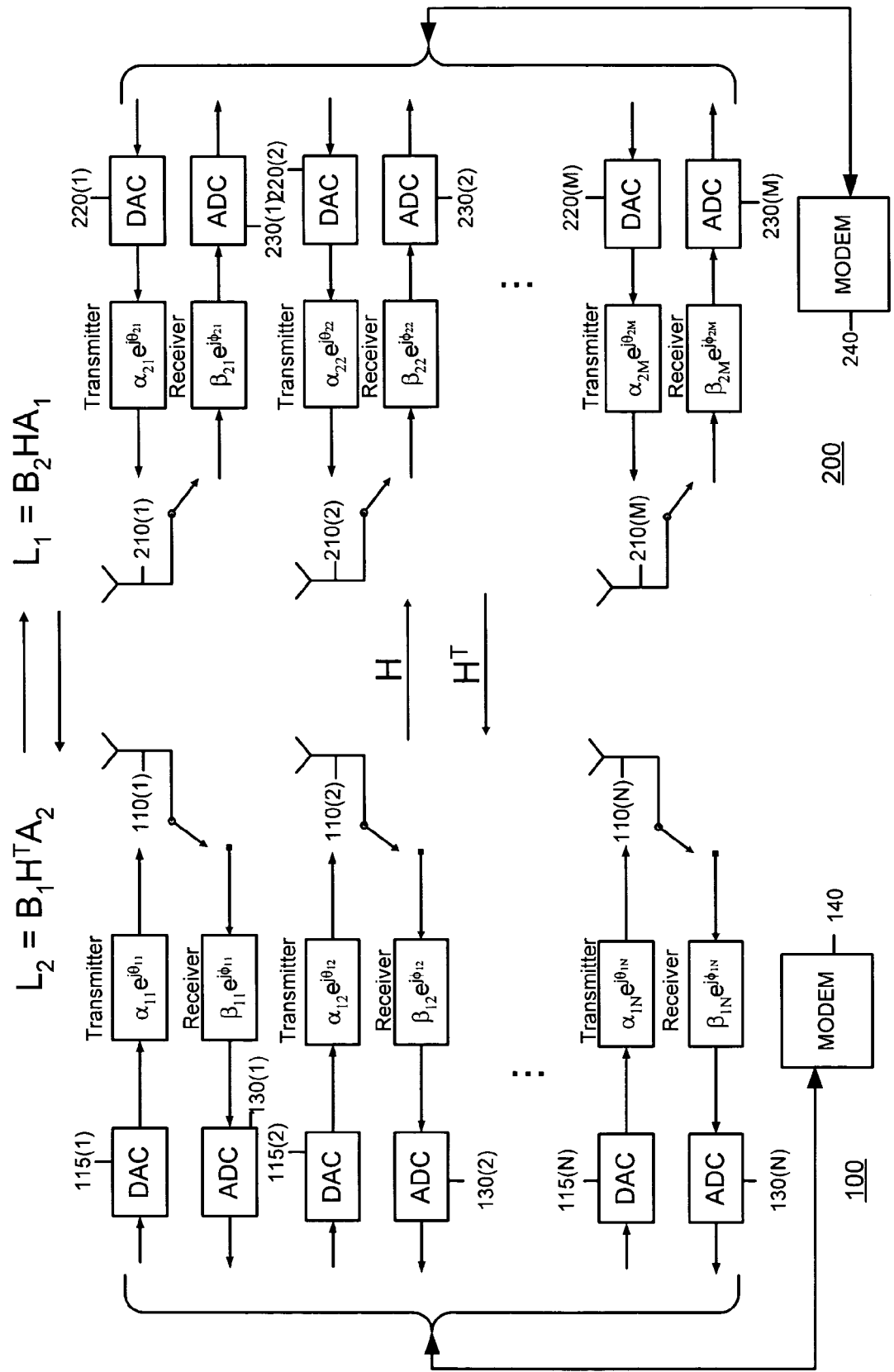
FIG. 1 is a block diagram showing two communication devices that communicate with each other using MIMO radio techniques.

Referring first to FIG. 1, the effects of amplitude and phase mismatches in an N×M MIMO channel will be described. $L_1$ and $L_2$ denote the channel response matrix from a first device 100, e.g., an AP to a second device 200, e.g., a STA, and STA to AP, respectively. A symmetrical MIMO channel has the property that $L_1 = L_2^T$.

Device 100 has N antennas 110(1) to 110(N) and device 200 has M antennas 210(1) to 210(M). Thus, device 100 has N transmit paths and N receive paths and device 200 has M transmit paths and M receive paths. Associated with each transmit path in device 100, there is a digital-to-analog converter (DAC) 115(1) to 115(N) that converts a digital baseband signal to an analog signal for transmission via a corresponding one of the antennas 110(1) through 110(N). Associated with each receive path in device 100 there is an analog-to-digital converter (ADC) 130(1) to 130(N) that converts an analog receive signal to a digital baseband signal. Likewise, in device 200, there is a DAC 220(1) to 220(M) in each transmit path and an ADC 230(1) to 230(M) in each receive path. Furthermore, device 100 has a modem 140 and device 200 has a modem 240. The modems 140 and 240 are processors that may be implemented by digital logic gates in application specific integrated circuits (ASICs).

For indoor radio communication systems such as an IEEE 802.11x wireless local area network (WLAN) in which a group of network terminals use carrier sense multiple access (CSMA) to exchange data at the same carrier frequency, the channel response between any two terminals is indeed symmetrical, but only between their antenna arrays. For example, the amplitude and phase response between the DAC 115(1) and antenna 110(1) for a first transmit path of the first device 100 is generally different from the amplitude and phase response between the antenna 110(1) and ADC 130(1) of a first receive path of the same device 100. Moreover, the amplitude and phase response between the DAC 115(2) and the antenna 110(2) for a second transmit path of the first device 100 is different from the amplitude and phase response between the DAC 220(1) and antenna 210(1) for a first transmit path of the second device 200. In order to exploit MIMO radio algorithms that depend on channel symmetry, the channel responses at baseband where the MIMO radio algorithm computations are applied need to be symmetric. Therefore, the effects of the amplitude and phase responses for the entire non-digital portion of the channel (e.g., from the DAC input to the transmitter paths to the ADC output of the receiver paths) must be accounted for, which includes the amplitude and phase responses of the transmitter components between each DAC and the corresponding antenna, and the amplitude and phase responses of the receiver components between an antenna and the corresponding ADC.

With amplitude and phase mismatch, the channel response matrices as seen by the logic of the modems 140 and 240 are modified as follows:

Device 100 to Device 200: $L_1 = B_2 H A_1$

Device 200 to Device 100: $L_2 = B_1 H^T A_2$ where $A_1$, $A_2$ are diagonal matrices that represent phase and amplitude imbalance caused by the transmitters in devices 100 and 200, respectively, and $B_1$, $B_2$ are diagonal matrices that represent phase and amplitude imbalance caused by the receivers in devices 100 and 200, respectively, where:

$$A_1 = \text{diag}(\alpha_{11} e^{j\phi 11}, \ldots, \alpha_{1N} e^{j\theta 1N})$$

$$A_2 = \text{diag}(\alpha_{21} e^{j\phi 21}, \ldots, \alpha_{2M} e_{2M} e^{j\theta 2M})$$

$$B_1 = \text{diag}(\beta_{11} e^{j\phi 11}, \ldots, \beta_{1N} e^{j\theta 1N})$$

$$B_2 = \text{diag}(\beta_{21} e^{j\phi 21}, \ldots, \beta_{2M} e^{j\theta 2M})$$

The phase and amplitude effects in the transmit and receive paths of each device are represented by corresponding values of the diagonal matrices $A_1$, $A_2$ and $B_1$, $B_2$.

The transmit weights for the n-th iteration of a MIMO radio algorithm disclosed in the aforementioned co-pending applications are:

$$w_{T,AP,n} = \gamma_n (L_2 * L_1)^n w_{T,AP,0}$$

$$w_{T,STA,n} = \rho_n L_1 * (L_2 L_1 *)^n w *_{T,AP,0},$$

where $\gamma_n$ and $\rho_n$ are scale factors used to normalize the transmit power to unity. It can be shown that the weights converge via a power iteration to the dominant eigenvectors for $L_2 * L_1$ and $L_1 * L_2$, respectively.

Figure 2:
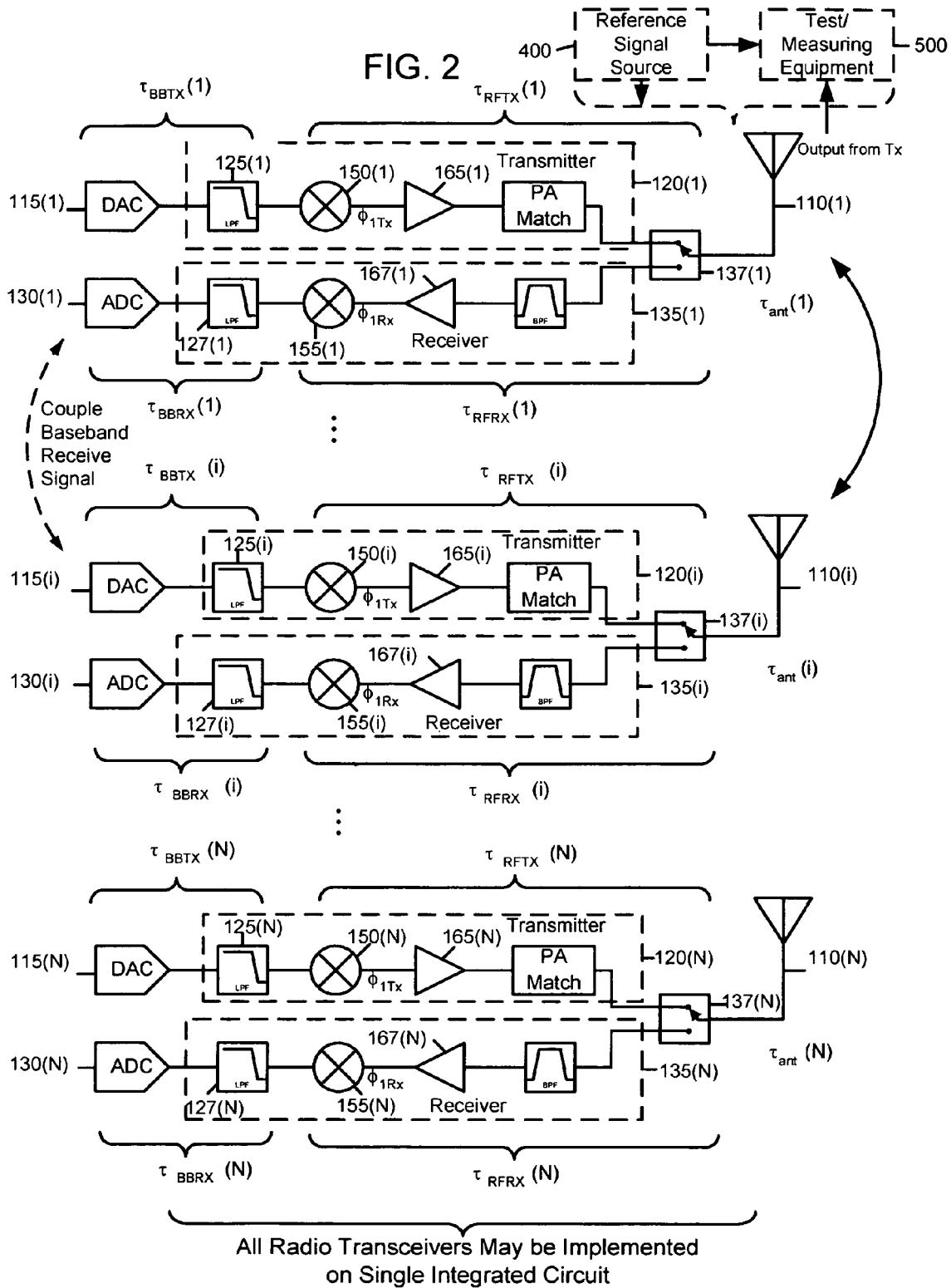
FIG. 2 is a more detailed block diagram of a device and showing sources of phase offsets among a plurality of radio transmitters and receivers.

With reference to FIG. 2, further details of a device 100 (having N antennas) are shown to explain sources of phase offsets. There is a plurality of radio transceivers, each radio transceiver associated with a corresponding one of the plurality of antennas 110(1) to 110(N). Each radio transceiver comprises a transmitter 120(*i*) and a receiver 135(*i*) associated with a corresponding one of the plurality of antennas, for i=1 to N. The radio transmitter 120(*i*) upconverts a baseband signal supplied by the associated DAC 115(*i*) to a radio frequency signal for transmission by a corresponding antenna 110(*i*). The receiver 135(*i*) downconverts a radio frequency signal detected by a corresponding antenna 110(*i*). The plurality of radio transceivers may be referred to as a MIMO radio.

The components contained in each transmitter 120(*i*) and receiver 135(*i*) can vary depending on the type of radio architecture employed, e.g., superheterodyne or direct-conversion. FIG. 2 shows, as an example only, components that may be found in a direct-conversion architecture, but it should be understood that the concepts of the calibration techniques described herein may apply to any type of radio architecture. For example, FIG. 2 shows that each transmitter 120(*i*) comprises an upconverter mixer 150(*i*), a power amplifier 165(*i*) and other miscellaneous components. Each receiver 135(*i*) comprises, for example, among other components, a low noise amplifier 167(*i*) and a downconverter mixer 155(*i*). A switch 137(*i*) associated with each antenna 110(*i*) selects whether the transmitter 120(*i*) or receiver 135(*i*) is connected to the antenna 110(*i*). On the baseband side, there is a low pass filter 125(*i*) in the transmitter path between the DAC 115(*i*) and RF portion of the transmitter 120(*i*), and a low pass filter 127(*i*) in the receiver path between the ADC 130(*i*) and the receiver 135(*i*).

As indicated in FIG. 2, the plurality of transmitters and plurality of receivers may be implemented on a single semiconductor integrated circuit (IC). A fully integrated MIMO radio is disclosed in co-pending commonly assigned U.S. patent application Ser. No. 10/065,388, filed Oct. 11, 2002, the entirety of which is incorporated herein by reference. Thus, a MIMO radio may consist of a plurality of separate radio transceivers, or a single IC on which a plurality of radio transceivers are implemented.

Sources of phase offsets $\phi_{1Tx}$, $\phi_{1Rx}$ to $\phi_{NTx}$, $\phi_{NRx}$ may include differences in local oscillator phase at the mixers $150(i)$ and $155(i)$ for each path, and small group delay differences among other radio components. Phase offsets may vary over process, voltage, and temperature. Group delay differences $\tau_{RFTx(1)}$, $\tau_{RFRx(1)}$, to $\tau_{RFTx(N)}$, $\tau_{RFRx(N)}$ among radio frequency (RF) components are on the order of tens of picoseconds, which cause phase offsets that vary slowly over the entire band of operation. For example, a 50 ps group delay offset causes a phase offset of 92.7 degrees at 5.15 GHz, and 96.3 degrees at 5.35 GHz. These types of offsets, therefore, may be corrected for at one frequency for each band of operation. Group delay differences among intermediate frequency (IF) components in a superheterodyne radio architecture (e.g., IF filters, AGC amplifiers, not shown in FIG. 2) may be 1 or 2 orders of magnitude larger than RF group delay offsets, thereby causing phase offsets that vary more rapidly across the band. Therefore, correction may be needed in each radio channel for designs using IF components. Group delay differences $\tau_{BBTx(1)}$, $\tau_{BBRx(1)}$, to $\tau_{BBTx(N)}$, $\tau_{BBRx(N)}$ among baseband components (e.g., low-pass filters, pipeline latency differences among ADCs and DACs) are, for IEEE 802.11x signal bandwidths, on the order of nanoseconds, and can therefore cause significant phase changes that vary even within the bandwidth of one channel.

One way to ensure optimal performance of the MIMO radio algorithms that depend on channel symmetry is to calibrate each device to ensure channel symmetry after calibration. In some cases, this involves correcting for phase and amplitude offsets, and in other cases, for phase offsets only. For example, simulations have shown that the equal-power MIMO radio algorithm disclosed in the aforementioned co-pending and commonly assigned application has advantages over a non-equal power MIMO radio algorithm because the equal-power algorithm is immune to even relatively large amplitude offsets.

Generally, correction in the transmit side for each device may be achieved by multiplying the transmit weights by a correction matrix $C=\text{diag}(c_1, \ldots, c_N)$, where $c_1=\gamma_1\exp(j\Omega_1), \ldots, c_N=\gamma_N\exp(j\Omega_N)$, where $\gamma_i$ is the amplitude correction component and $\Omega_i$ is the phase correction component. The modified channel response matrices become $L_1=B_2 HA_1 C_1$ and $L_2=B_1 H^T A_2 C_2$.

A sufficient condition to ensure channel symmetry in the link is $$B_1=A_1C_1 \text{ and } B_2=A_2C_2 \quad (1)$$

This condition guarantees a symmetric channel since $$L_2^T=(B_1H^TA_2C_2)^T=B_2^THA_1^TC_1^T=B_2HA_1C_1=L_1.$$

Referring back to FIG. 1, an equivalent way to write condition (1) for an N×M symmetric MIMO radio channel is:

$$\gamma_{11}\alpha_{11}/\beta_{11}\exp[j(\Omega_{11}+\theta_{11}-\phi_{11})]=\gamma_{12}\alpha_{12}/\beta_{12}\exp[j(\Omega_{12}+\theta_{12}-\phi_{12})]=\ldots=\gamma_{1N}\alpha_{1N}/\beta_{1N}\exp[j(\Omega_{1N}+\theta_{1N}-\phi_{1N})]; \text{ and}$$

$$\gamma_{21}\alpha_{21}/\beta_{21}\exp[j(\Omega_{21}+\theta_{21}-\phi_{21})]=\gamma_{22}\alpha_{22}/\beta_{22}\exp[j(\Omega_{22}+\theta_{22}-\phi_{22})]=\ldots=\gamma_{2M}\alpha_{2M}/\beta_{2M}\exp[j(\Omega_{2M}+\theta_{2M}-\phi_{2M})],$$

where $\theta$ and $\phi$ are the phase responses and $\alpha$ and $\beta$ are the amplitude responses of the transmitters and receivers, respectively, of the devices 100 and 200. The subscripts i,j used in FIG. 1 indicates the device i, (device 1 meaning device 100, or device 2 meaning device 200), and the j-th antenna (or corresponding antenna path) of device i.

Still another equivalent way to write condition (1) is:
For amplitude, $$\gamma_{11}\alpha_{11}/\beta_{11}=\gamma_{12}\alpha_{12}/\beta_{12}=\ldots=\gamma_{1N}\alpha_{1N}/\beta_{1N}; \text{ and}$$

$$\gamma_{21}\alpha_{21}/\beta_{21}=\gamma_{22}\alpha_{22}/\beta_{22}=\ldots=\gamma_{2M}\alpha_{2M}/\beta_{2M};$$

For phase, $$[\Omega_{11}+\theta_{11}-\phi_{11}]=[\Omega_{12}+\theta_{12}-\phi_{12}]=\ldots=[\Omega_{1N}+\theta_{1N}-\phi_{1N}]; \text{ and}$$

$$[\Omega_{21}+\theta_{21}-\phi_{21}]=[\Omega_{22}+\theta_{22}-\phi_{22}]=\ldots=[\Omega_{2M}+\theta_{2M}-\phi_{2M}]$$

2(N−1) and 2(M−1) linearly independent equations are required to specify this condition for side 1 and side 2, respectively:

$$[\Omega_{11}+\theta_{11}-\phi_{11}]=[\Omega_{12}+\theta_{12}-\phi_{12}]; \gamma_{11}\alpha_{11}/\beta_{11}=\gamma_{12}\alpha_{12}/\beta_{12}$$

$$[\Omega_{11}+\theta_{11}-\phi_{11}]=[\Omega_{13}+\theta_{13}-\phi_{13}]; \gamma_{11}\alpha_{11}/\beta_{11}=\gamma_{13}\alpha_{13}/\beta_{13}$$

...

$$[\Omega_{11}+\theta_{11}-\phi_{11}]=[\Omega_{1N}+\theta_{1N}-\phi_{1N}]; \gamma_{11}\alpha_{11}/\beta_{11}=\gamma_{1N}\alpha_{1N}/\beta_{1N}; \text{ and}$$

$$[\Omega_{21}+\theta_{21}-\phi_{21}]=[\Omega_{22}+\theta_{22}-\phi_{22}]; \gamma_{21}\alpha_{21}/\beta_{21}=\gamma_{22}\alpha_{22}/\beta_{22}$$

$$[\Omega_{21}+\theta_{21}-\phi_{21}]=[\Omega_{23}+\theta_{23}-\phi_{23}]; \gamma_{21}\alpha_{21}/\beta_{21}=\gamma_{23}\alpha_{23}/\beta_{23}$$

...

$$[\Omega_{21}+\theta_{21}-\phi_{21}]=[\Omega_{2M}+\theta_{2M}-\phi_{2M}]; \gamma_{21}\alpha_{21}/\beta_{21}=\gamma_{2M}\alpha_{2M}/\beta_{2M}$$

The above-equations may be re-written for one device on the link, e.g., the N-side, as follows:

$$[\Omega_1+\theta_1-\phi_1]=[\Omega_2+\theta_2-\phi_2]; \gamma_1\alpha_1/\beta_1=\gamma_2\alpha_2/\beta_2$$

$$[\Omega_1+\theta_1-\phi_1]=[\Omega_3+\theta_3-\phi_3]; \gamma_1\alpha_1/\beta_1=\gamma_3\alpha_3/\beta_3$$

...

$$[\Omega_1+\theta_1-\phi_1]=[\Omega_N+\theta_N-\phi_N]; \gamma_1\alpha_1/\beta_1=\gamma_N\alpha_N/\beta_N; \quad (2a)$$

After some algebraic manipulation, equation (2a) may be equivalently written as follows:

$$[\Omega_1+\theta_1+\phi_2]=[\Omega_2+\theta_2+\phi_1]; \gamma_1\alpha_1\beta_2=\gamma_2\alpha_2\beta_1$$

$$[\Omega_1+\theta_1+\phi_3]=[\Omega_3+\theta_3+\phi_1]; \gamma_1\alpha_1\beta_2=\gamma_3\alpha_3\beta_1$$

...

$$[\Omega_1+\theta_1+\phi_N]=[\Omega_N+\theta_N+\phi_1]; \gamma_1\alpha_1\beta_2=\gamma_N\alpha_N/\beta_1 \quad (2b)$$

In equations (2a) and (2b), the first subscript has been dropped to indicate that without loss of generality, the equations can be used on either side of the link. To ensure channel symmetry, the relationship of equations (2a) or (2b), which are equivalent, must hold at both devices on the link. The relationships of equations (2a) and (2b) are described below. Some basic nomenclature is first provided. At a device, for each antenna there is a corresponding transmitter that upconverts a signal for transmission by that antenna and a corresponding receiver that downconverts a signal detected by that antenna. Moreover, each antenna has a corresponding antenna path in both transmit and receive directions. The signal path from the input of a transmitter to the output of its corresponding antenna may be referred to as a transmit path for that antenna. Likewise, the signal path from the input of an antenna to the output of the corresponding receiver may be referred to as a receive path for that antenna. Phase and (optionally) amplitude offset correction values are applied to signals (in the transmit path direction, receive path direction, or both directions) for each antenna path associated with the plurality of antennas.

One way to describe the relationship of equation (2a) is that in a device, the difference between (a) the amplitude and phase response from an input of a transmitter to the output of its corresponding antenna and (b) the amplitude and phase response from the input of that antenna to the output of its corresponding receiver is the same (and is constant) for all antennas (i=1 to N of an N-antenna device). One way to describe the relationship of equation (2b) is that in a device, (a) the amplitude and phase response from an input to a transmitter associated with one antenna (e.g., antenna 1) to the output of the receiver associated with another antenna (e.g., antenna i) is equal to (b) the amplitude and phase response from the input of the transmitter associated with antenna i to the output of the receiver associated with antenna 1, for all antennas (i=2 to N of an N-antenna device).

The explanation of equation (2b) suggests a loop-back configuration, described hereinafter, may be used to obtain measurements needed to compute the correction values $\gamma_i$ and $\Omega_i$ to correct for the amplitude and phase offsets among the plurality of transmitters and plurality of receivers of a device, thereby satisfying the condition of equation (2b) when that device transmits and receives signals. To reiterate, correction values that satisfy equation (2b) will also satisfy the equivalent equation (2a).

Figure 3:
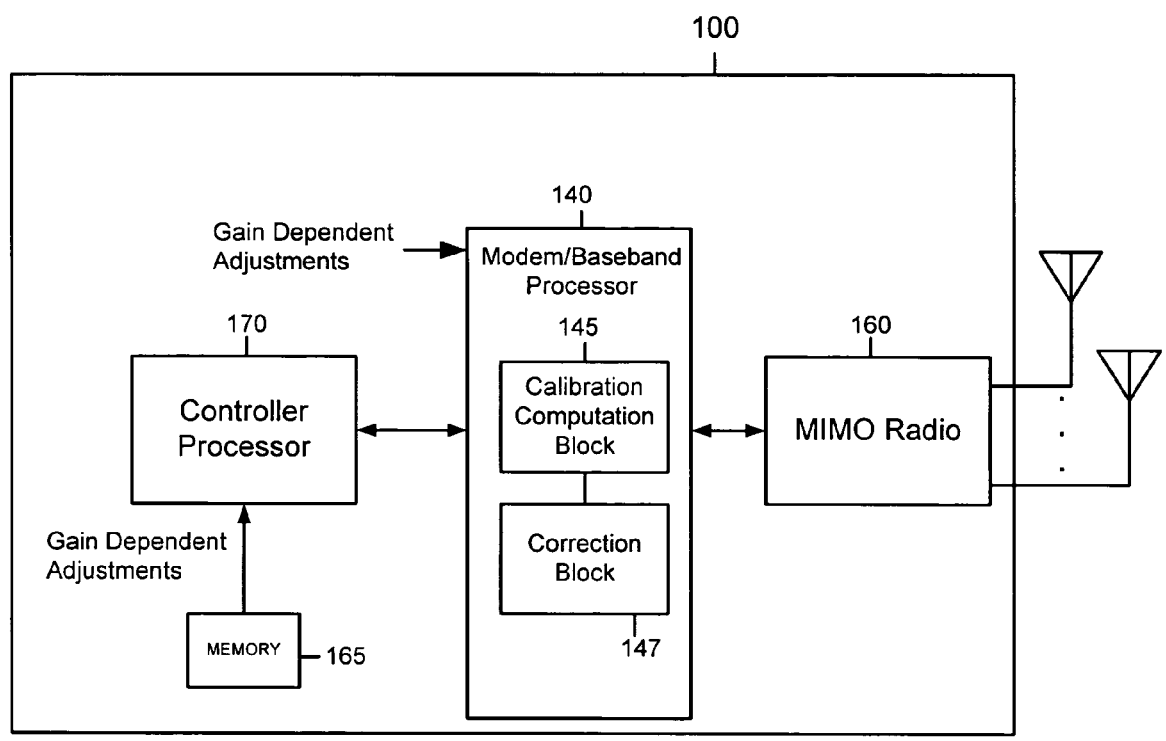
FIG. 3 is a general block diagram of a communication device that employs techniques to correct for the phase offsets shown.

FIG. 3 shows device 100 having a MIMO radio 160 for which correction values ($\Omega_i$ and $\gamma_i$) are computed in order to achieve the condition of equations (2a) or (2b). The modem 140 comprises a calibration computation block 145 that generates the signals to be used for the calibration measurement procedure, makes the measurements and computes and stores the correction values. The modem 140 also has a correction block 147 that applies correction values to the baseband transmit signals or transmit weights, or to the baseband receive signals, or to both the baseband transmit signals and baseband receive signals to achieve a desired net correction. There are many techniques for generating the calibration parameters and applying those parameters as described hereinafter. A controller processor 170, such as a microprocessor, may generate a signal coupled to the modem 140 to initiate a self-calibration mode at initial power up of the device, and/or periodically or occasionally thereafter to update the calibration parameters. Each device that relies on a symmetrical link with another device will self-calibrate in a similar manner. The correction values are also referred herein as alignment values and/or calibration parameters.

In the case where variable gain amplifiers are used in the receivers and/or transmitters, calibration can take into account the changes in phase with respect to the applied gain setting of these components. One technique is to determine the phase versus gain setting relationship of receiver and transmitter components, and store adjustments to gain-independent correction values (such as in a table) in the memory 165, or alternatively, hard-code those adjustments in the digital logic of the modem 140 as shown in FIG. 3. These gain-dependent adjustments to the correction values may be generated at the factory one time, and then during a run-time operation or mode of the device in the field, the adjustments are used according to the current gain setting(s) of the device. Alternatively, gain-dependent adjustments for the correction values may be computed in the field during a self-calibration mode or operation. Gain-independent correction values may be computed during a self-calibration mode of a device in the field and/or at the factory. Gain-dependent adjustments to the correction values may be generated (at the factory or in the field) using techniques as described below in conjunction with FIGS. 4 and 5 at each gain setting.

The calibration logic is located in the modem 140 because the modem is typically implemented with digital logic gates in an ASIC that processes the baseband signals. It should be understood that for certain applications, or with the advancement of microprocessor capabilities for portable or embedded applications, the calibration logic may be implemented in software stored or encoded in a processor readable memory medium and executed by the processor 170 (that also executes the modem logic).

After a calibration session is performed, correction values are used when processing baseband transmit signals and/or baseband receive signals to achieve the condition of equations (2a) or (2b). When a first device calibrated to these conditions communicates with a second device similarly calibrated, the channel response between the digital input (DAC input) of the transmit paths of the first device to the digital output (ADC output) of the receive paths of the second device is symmetrical to the channel response between the digital input (DAC input) of the transmit paths of the second device to the digital output (ADC output) of the receive paths of the first device. Thus, the channel response between the two devices at the baseband signal processing level is symmetrical, which is desirable for MIMO radio algorithms that depend on channel symmetry.

For relatively large group delay offsets (usually caused by baseband transmitter and/or receiver components), the phase mismatch among transceiver paths will vary within the bandwidth of the transmitted signal, thus requiring phase alignment that varies over frequency. As shown in FIG. 5 and described hereinafter, for multi-carrier modulation systems such as orthogonal frequency division multiplexed (OFDM) systems, this may be accomplished by using different phase alignment matrices C(k) for each OFDM sub-carrier in either the transmitter, the receiver, or both. Another approach shown in FIG. 4 and described hereinafter is to align the group delay of each transceiver path using (1) an all pass filter (e.g., a re-sampler) in the either the transmitter, receiver or both, and (2) frequency non-selective phase correction values (a single frequency independent correction matrix) to compensate for broadband phase offsets. The re-sampler may be a Farrow type re-sampler process, as an example.

Figure 4:
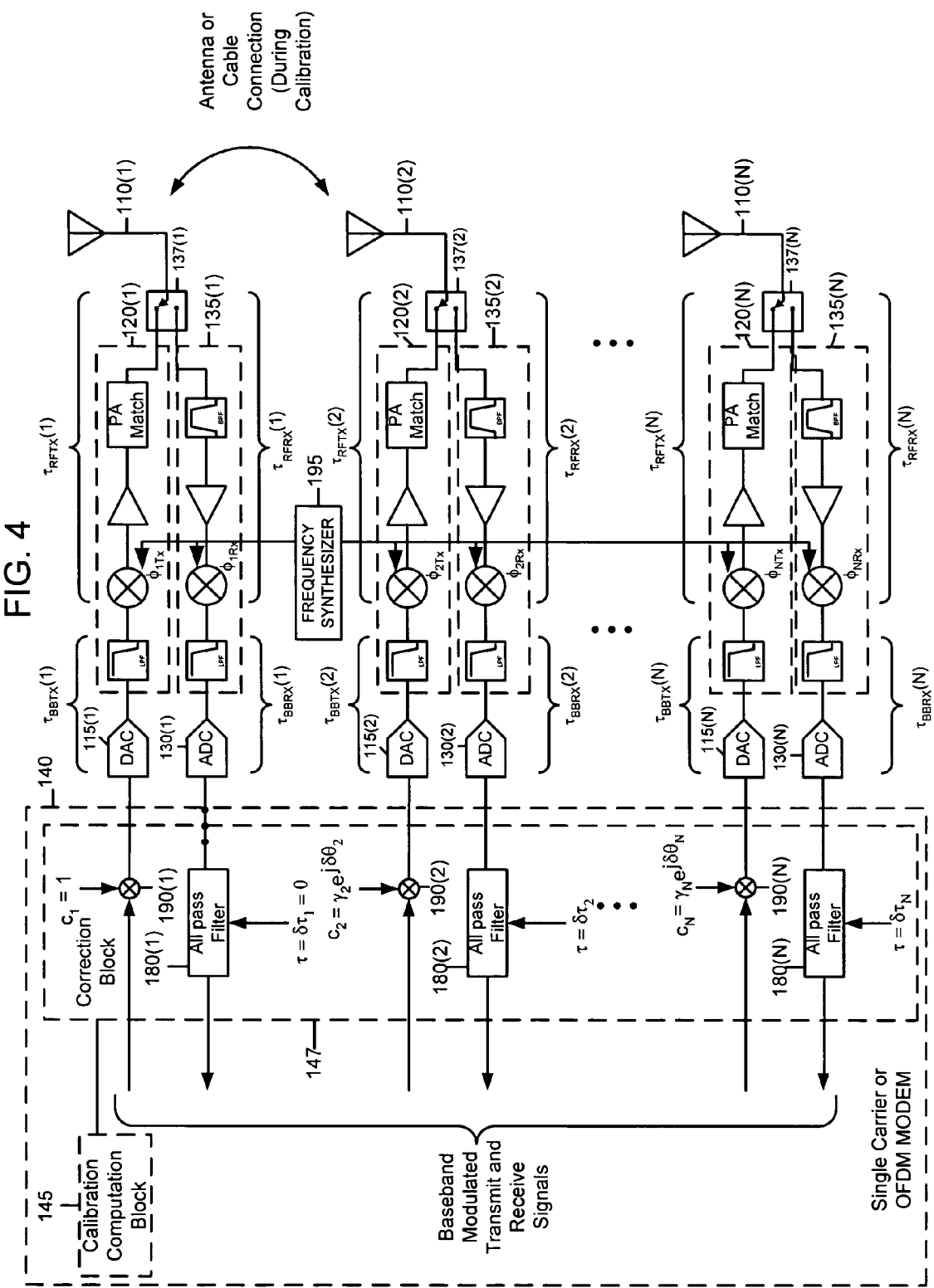
FIG. 4 is a block diagram of a device in which phase and amplitude offsets are corrected for using all pass filters and alignment matrices for single carrier or orthogonal frequency division multiplex (OFDM) systems.
Figure 5:
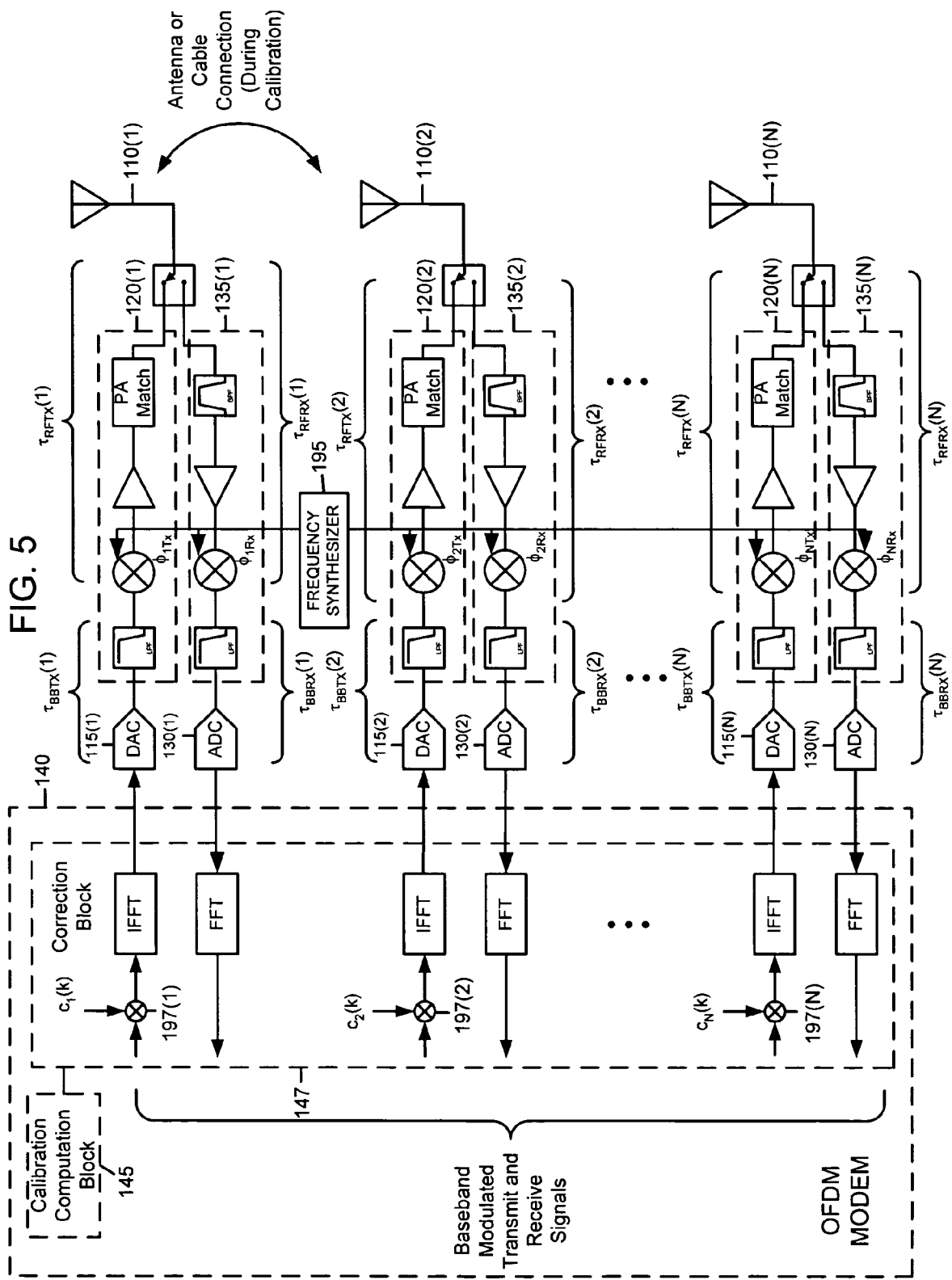
FIG. 5 is a block diagram of a device in which phase and amplitude offsets are corrected for using alignment matrices for OFDM systems.

Turning to FIG. 4, the relevant portions of an N-antenna device (such as device 100 shown in FIG. 3) capable of MIMO radio communication are shown where correction for amplitude and phase offsets are made. The approach of FIG. 4 is useful for single carrier or multi-carrier modulation systems. The modem 140 is shown comprising the calibration computation block 145 and the correction block 147. The correction block 147 comprises all pass filters 180(1) to 180(N) and multipliers 190(1) to 190(N). The multipliers 190(1) to 190(N) apply corresponding elements of the single (frequency-nonselective) correction matrix C=diag($c_1, \ldots, c_N$), where $c_i$ is defined as $\gamma_i \exp(j\Omega_i)$ to compensate for phase offsets and amplitude offsets. The components of phase correction values $\Omega_i$ are described in more detail below.

The approach shown in FIG. 4 performs the baseband group delay alignment in the receiver portion of the modem. This approach is attractive from a gate count perspective because an all pass filter (e.g., re-sampler) is already required in most receiver modem architectures for data timing recovery, and may be useful for single carrier systems, such as IEEE 802.11b, but may also attractive for multi-carrier systems, such as OFDM systems. As described hereinafter in conjunction with FIG. 6, digital logic gates that implement the all pass filters and multipliers may be in the transmitter paths, receiver paths or both paths to compensate for amplitude and phase offsets.

The multipliers 190(1) to 190(N) may be the same multipliers used to apply the transmit weights $w_T$ to the baseband transmit signals prior to upconversion and transmission. In this case, the transmit weight $w_T$ (a complex number) is multiplied by the corresponding element $c_i$ of the diagonal matrix C.

A procedure to generate the calibration parameters for an N-antenna device shown in FIG. 4 follows. The calibration computation block 145 contains the logic to perform the calibration procedure and to generate the calibration parameters for the all pass filters 180(1) to 180(N) and for the multipliers 190(1) to 190(N).

Step 1. A frequency synthesizer 195 is tuned to a known frequency channel in the radio frequency band of interest. The modem generates a baseband continuous wave (CW) tone $e^{2\pi j \phi kt}$ that is coupled to the DAC 115(1) associated with antenna 110(1) (antenna path 1) for transmission via antenna 110(1) through transmitter 120(1), and, using either a cable or an over-the-air link, the transmit RF output of antenna path 1 is looped back to the RF input at antenna 110(2) (antenna path 2). A first phase difference between the signal at the input to the DAC 115(1) in antenna path 1 and the signal at the output of the ADC 130(2) in antenna path 2 is measured at a number of frequencies (e.g., $f_k=\{-3f_s/8, -f_s/8, f_s/8, 3f_s/8\}$, where $f_s$=symbol rate). In general, measurements are made at frequencies that sufficiently span the bandwidth of the baseband signal. The first phase difference $\psi_{12}(k)=[\theta_1(k)+\phi_2(k)+\phi ant(1,2)]$, where $\theta_1(k)$ and $\phi_2(k)$ represent phase shifts through transmitter 120(1) and receiver 135(2) at frequency $f_k$, respectively, and $\phi_{ant}(1,2)$ represents the phase shifts of the over-the-air or cable connection between antenna 110(1) and antenna 110(2). In addition, a first amplitude $\gamma_{12}(k)$ of the signal at the output of the ADC 130(2) is measured at each frequency $f_k$.

Step 2. Repeat step 1 using antenna path 2 as the transmitter and antenna path 1 as the receiver to measure a second phase difference $\psi_{21}(k)=[\theta_2(k)+\phi_1(k)+\phi ant(1,2)]$ and to measure a second amplitude $\gamma_{21}(k)$ of the signal at the output of the ADC 130(1) at each of the frequencies $f_k$.

In steps 1 and 2 above, since the signal transmitted (via a cable or over-the-air) from one antenna path to another will not experience sufficient attenuation before being received, the (low noise) amplifier in the receive path may be turned off or its gain setting turned down (lowered) so that the received signal does not damage the mixer and other components in the receive path.

Step 3. The in-band group delay offset or mismatch between antenna path 1 and antenna path 2 is estimated using the equation:

$\delta\tau_2 = -(1/2\pi)$*slope of a best fit line through points $\{(f_k, \psi_{12}(k)-\psi_{21}(k))\}$ across the frequencies $f_k$.

Step 4. The broadband phase offset or mismatch between the antenna path 1 and an antenna path 2 is estimated using the equation:

$\delta\theta_2$=y-intercept of a best fit line through points $\{(f_k, \psi_{12}(k)-\psi_{21}(k))\}$ across the frequencies $f_k$.

The amplitude mismatch $\gamma_2$ is estimated from an average of the ratios of the first and second measured amplitudes, i.e., $\{(f_k, \gamma_{12}(k)/\gamma_{21}(k))\}$, across the frequencies $f_k$.

Step 5. Steps 1–4 are repeated between antenna paths 1 and i to compute group delay offsets $\delta\tau_i$ and broadband phase offsets $\delta\theta_i$ from points $\{(f_k, \psi_{1i}(k)-\psi_{i1}(k))\}$ across the frequencies $f_k$, and amplitude offsets $\gamma_i$, for i=3, ..., N from $\{(f_k, \gamma_{1i}(k)/\gamma_{i1}(k))\}$. The values for $\delta\tau_1, \ldots, \delta\tau_N$, $\delta\theta_1, \ldots, \delta\theta_N$, and $\gamma_1, \ldots, \gamma_N$ and are stored as calibration parameters or correction values, where for the antenna path associated with the first antenna, the group delay offset $\delta\tau_1=0$, the broadband phase offset $\delta\theta_1=0$ and the amplitude offset $\gamma_1=1$. The units for $\delta\tau_i$ are samples at an appropriate sampling rate.

Step 6. The in-band group delay mismatch among transceiver paths may be corrected during normal operation by creating a group delay of $\delta\tau_i$ samples in receiver path i using an all pass filter i for i=1, ..., N as shown in FIG. 4. $\delta\tau_i>0$ implies a delay and $\delta\tau_i<0$ implies an advance. The broadband phase offsets (and optionally amplitude offsets) among the transceiver paths may be removed by multiplying the transmit weights or the baseband transmit signals with a diagonal alignment matrix, C, where:

$c_1=1$ $c_2=\gamma_2 \exp(j\delta\theta_2)$ $c_3=\gamma_3 \exp(j\delta\theta_3)$

...

$c_N=\gamma_N \exp(j\delta\theta_N)$

If amplitude offset correction is not performed, then $\gamma_i=1$ for all i.

Step 7. If necessary, steps 1–6 may be repeated at multiple channels within the RF band to account for slowly varying phase offsets. The phase shifts through the antennas and/or coupling cables do not affect the results of any of the computations. Correction values for each channel may be stored, or a set of channel-independent correction values is stored and channel-dependent adjustments to the channel-independent set of calibration parameters are stored for each channel.

The process of FIG. 4 may be modified by using a multi-carrier modulated signal, e.g., an OFDM signal, instead of multiple tones at frequencies $f_k$. Moreover, the procedure described above can be generalized or extended to a multi-carrier modulation scheme, such as OFDM, where instead of making phase difference measurements at frequencies $f_k$ across the bandwidth of a single-carrier baseband signal, measurements are made at a plurality of sub-carriers k (not necessarily all sub-carriers k) of a multi-carrier baseband signal, sufficient to perform the linear analysis (slope and y-intercept computations) described above.

To summarize, offsets values are computed for antenna paths corresponding to antennas i=1 to N, where the corresponding broadband phase offset values $\delta\theta_i$ and the corresponding in-band group delay values $\delta\tau_i$, are estimated from the sequence $\{\psi_{1i}(k)-\psi_{i1}(k)\}$ derived from frequencies $f_k$ across the bandwidth of the baseband signal, where $\psi_{1i}(k)$ is the phase difference (also referred to as a first phase difference) between the input to a transmitter associated with a first antenna and the output of a receiver associated with antenna i at a frequency $f_k$, and $\psi_{i1}(k)$ is the phase difference (also referred to as a second phase difference) between the input to a transmitter associated with antenna i and the output of a receiver associated with the first antenna at frequency $f_k$, and where $\delta\theta_1=0=\delta\tau_1$. Corresponding amplitude offsets $\gamma_i$ are computed from the amplitude ratios described above.

Using the phase (and optionally amplitude) offsets computed by the calibration computation block as described above in conjunction with FIG. 4, the correction block 147 in the modem 140 processes (e.g., multiplies) the plurality of baseband transmit signals (or transmit weights) and/or plurality of baseband receive signals with corresponding correction values that correct for differences in phase (and optionally) amplitude among the plurality of transmitters and plurality of receivers such that when signals are transmitted by the plurality of transmitters and/or signals are received by the plurality of receivers, the difference between (1) the phase response from an input to a transmitter to the output of its corresponding antenna and (2) the phase response from the input of that antenna to the output of its corresponding receiver is the same for each of the plurality of antennas (i.e., constant for all antenna paths).

Specifically, when correcting for (broadband) phase offsets, the modem 140 processes the plurality of baseband transmit signals and/or plurality of baseband receive signals with corresponding broadband phase offset correction values that achieves a net phase offset correction equal to the broadband phase offsets computed for the antenna paths associated with antennas for i=1 to N. Similarly, when correcting for amplitude offsets, the modem 140 (using the correction block 147) processes the plurality of baseband transmit signals and/or the plurality receive signals with corresponding amplitude correction values that achieves a net amplitude offset correction equal to amplitude offsets computed for antenna paths associated with the corresponding antennas i=1 to N. Furthermore, when correcting for in-band phase offsets, the modem 140 processes the plurality of baseband transmit signals and/or plurality of baseband receive signals with corresponding group delay correction values that achieves a net group delay offset correction equal to the group delay offsets computed for antenna paths of the corresponding antennas i=1 to N.

FIG. 5 shows an approach suitable for a multi-carrier modulation scheme, such as OFDM. The correction block 147 comprises a plurality of multipliers 197(1) to 197(N) that apply transmit alignment or correction matrices $C_k$ to remove phase and optionally amplitude offsets at each OFDM sub-carrier k. The multipliers 197(1) to 197(N) may be the same multipliers used to apply the transmit weights $w_B$ (for i=1 to N) to the baseband transmit signals to be transmitted. A technique to generate the transmit alignment matrices $C_k$ is as follows.

Step 1. The frequency synthesizer 195 is tuned to a known frequency channel in the radio frequency band of interest. A baseband OFDM signal is transmitted using a known BPSK modulation pattern through the DAC 115(1) in antenna path 1, and, using either a cable or an over-the-air connection, that signal is looped back from antenna 110(1) of antenna path 1 to the RF input at antenna 110(2) of antenna path 2.

A first phase difference is measured between the input to the DAC 115(1) of antenna path 1 and the output of the ADC 130(2) of antenna path 2 at each OFDM sub-carrier. The first phase difference $\psi_{12}(k)=[\theta_1(k)+\phi_2(k)+\phi_{ant}(1,2)]$, where $\theta_1(k)$ and $\phi_2(k)$ represent phase shifts through the transmitter of antenna path 1 and the receiver of antenna path 2 at the k-th OFDM sub-carrier, respectively, and $\phi_{ant}(1,2)$ represents the phase shift of the over-the-air or cable connection between antenna 110(1) and antenna 110(2), which is the same in either direction. In addition, a first amplitude $\gamma_{12}(k)$ of the signal at the output of the ADC 130(2) is measured.

Step 2. Repeat step 1 using antenna path 2 as the transmitter and antenna path 1 as the receiver to measure a second phase difference $\psi_{21}(k)=[\theta_2(k)+\phi_1(k)+\phi_{ant}(1,2)]$ and to measure a second amplitude $\gamma_2(k)$ of the signal at the output of the ADC 130(1).

Step 3. Repeat steps 1 and 2 between antenna path 1 and i, for i=3 to N, to measure the first phase difference $\psi_{1i}(k)$ and the second phase difference $\psi_{i1}(k)$ and the first and second amplitudes $\gamma_{i1}(k)$ and $\gamma_{1i}(k)$.

Step 4. A diagonal phase alignment or correction matrix C(k) is computed as follows:

$c_1(k)=1$ $c_2(k)=\gamma_2(k)\exp(j[\psi_{12}(k)-\psi_{21}(k)])=\gamma_2(k)\exp(j([\theta_1(k)+\phi_2(k)]-[\theta_2(k)+\phi_1(k)]))$ $c_3(k)=\gamma_3(k)\exp(j[\psi_{13}(k)-\psi_{31}(k)])=\gamma_3(k)\exp(j([\theta_1(k)+\phi_3(k)]-[\theta_3(k)+\phi_1(k)]))$

...

$c_N(k)=\gamma_N(k)\exp(j[\psi_{1N}(k)-\psi_{N1}(k)])=\gamma_N(k)\exp(j([\theta_1(k)+\phi_N(k)]-[\theta_N(k)+\phi_1(k)]))$ where $\gamma_i(k)$ is computed from a ratio of the first and second measured amplitudes, i.e., $(\gamma_{1i}(k)/\gamma_{i1}(k))$, and $\gamma_1=1$. The values for the matrices C(k) are stored as calibration parameters. This selection of C(k) satisfies the symmetry condition (3) for all k. The phase offset and optionally amplitude offset among the transceiver paths may be removed at each sub-carrier by multiplying the data symbol at sub-carrier k by the diagonal alignment matrix C(k). Thus, while not specifically shown in FIG. 5, multipliers 197(i) include an array of multipliers to perform multiplication of $c_i(k)$ at all of the sub-carriers k.

Step 5. If necessary, steps 1–4 may be repeated at multiple channels within the RF band to account for slowly varying phase offsets. The phase shifts through the antennas and/or coupling cables do not affect the results of any of the computations.

To summarize, a diagonal offset matrix C(k) is computed for each sub-carrier k comprised of values $c_i(k)$, where $c_i(k)=\gamma_i(k)\exp(j[\psi_{1i}(k)-\psi_{i1}(k)])$ for i=2 to N, where N is the number of antennas, and where $\psi_{1i}(k)$ is a phase difference (also referred to as a first phase difference) between an input to a transmitter associated with a first antenna and an output of a receiver associated with antenna i at sub-carrier k, $\psi_{i1}(k)$ is a phase difference (also referred to as a second phase difference) between an input to a transmitter associated with antenna i and an output of a receiver associated with the first antenna at sub-carrier k, $\gamma_i(k)=(\gamma_{1i}(k)/\gamma_{i1}(k))$, and where $c_1(k)=1$. When processing baseband signals, the modem 140 processes the plurality of plurality of baseband transmit signals and/or the plurality of baseband receive signals with phase offset correction values for each sub-carrier k that achieves a net phase offset correction equal to a matrix diag[$c_1(k), c_2(k), \ldots, c_N(k)$], where $c_i(k)=\exp(j$

[$\psi_{1i}(k)-\psi_{i1}(k)$]), and where $\psi_{1i}(k)$ is the first phase difference and $\psi_{i1}(k)$ is the second phase difference, for i=2 to N, and where $c_1(k)=1$.

In some situations, examples of which are described hereinafter, it may not be necessary to generate frequency selective or dependent correction matrices for multi-carrier systems. A single frequency non-selective (frequency independent) correction matrix may suffice to correct for broadband phase shifts. For these cases, instead of computing a phase shift offset correction value at each sub-carrier k for each antenna path, a single offset correction value for each antenna path is computed from a y-intercept of a line fit through points {(sub-carrier k, $\psi_{1i}(k)-\psi_{i1}(k)$)} associated with a plurality of sub-carriers k, where $\psi_{1i}(k)$ is the first phase difference measured at sub-carrier k and $\psi_{i1}(k)$ is the second phase difference measured at frequency sub-carrier k, and where the phase offset for the antenna path associated with the first antenna is 0. Similarly, for amplitude offsets, rather than computing an amplitude offset at each sub-carrier k for each antenna, a single amplitude offset is computed for each antenna from an average of a ratio between the first amplitude and the second amplitude across a plurality of sub-carriers k. The phase difference measurements need not be made at each of the plurality of sub-carriers k, but at a sufficient number to perform the linear analysis (y-intercept) described above. This procedure then becomes very similar to the process described above in conjunction with FIG. 4.

An advantage of the calibration techniques described herein is that they do not require any external equipment. They can be performed by embedding logic within the device to enable the device to perform self-calibration.

On the other hand, the techniques described herein may be conducted with the use of RF test equipment to measure the phase and amplitude offsets between antenna loop back paths instead of DSP logic, if so desired, for laboratory or experimental situations. When test equipment is used, a reference signal (either CW or OFDM) is injected into the radio receiver; the signal is looped back at baseband to measure the phase difference at RF using test equipment.

To explain further with reference to FIG. 2, a (CW or OFDM) reference signal is supplied into the radio receiver circuitry 135(1) associated with antenna 110(1) and the baseband signal generated by that receiver is converted to a digital signal by the ADC 130(1) and connected as input to the DAC 115(2) associated with antenna 115(2) and processed by the transmitter 120(2) and the phase of signal at the output of the transmitter 120(2) is compared with the phase of the reference signal supplied to the receiver 135(1) to generate a first phase difference or delta. The reference signal is supplied by a reference signal source 400. Both the reference signal and the signal at the output of the transmitter 120(2) are coupled to test or measuring equipment 500 that measures the first phase difference. Next, the same process is performed when a reference signal is supplied to the receiver 135(2) and the signal output by the receiver 135(2) is converted to a digital signal by the ADC 130(2) and then coupled as input to the DAC 115(1) associated the transmitter 120(1). The phase of the signal at the output of the 120(1) is compared with the phase of the reference signal supplied to the input of the receiver 135(2) to produce a second phase difference or delta. Then, the phase mismatch between antenna path 1 and antenna path 2 is determined by computing the difference between the first phase difference or delta and the second phase difference or delta.

This same process is repeated between the first antenna path and the other antenna paths (e.g., antenna paths 3-N) in order to compute the phase mismatch between the first antenna path and each of the other antenna paths. Phase correction values corresponding to the phase mismatches are then applied to the baseband transmit and/or receive signals to account for the mismatches. The reference signal may be a continuous wave tone signal and the process may be repeated at each of a plurality of frequencies across or within the bandwidth of a baseband signal to be communicated using the MIMO process. Similarly, the reference signal may be a multi-carrier (e.g., ODFM) signal and the phase mismatches are measured at each sub-carrier of the multi-carrier signal. The computations described herein are applied to produce the corrections values which are in turn applied to the baseband transmit and/or receive signals, whether based on an OFDM signal or CW signal. Furthermore, these baseband loop-back techniques may be employed to generate amplitude offsets by measuring the amplitude offset between the reference signal and the signal that is produced at the output of the transmitter or the other antenna path.

Figure 6:
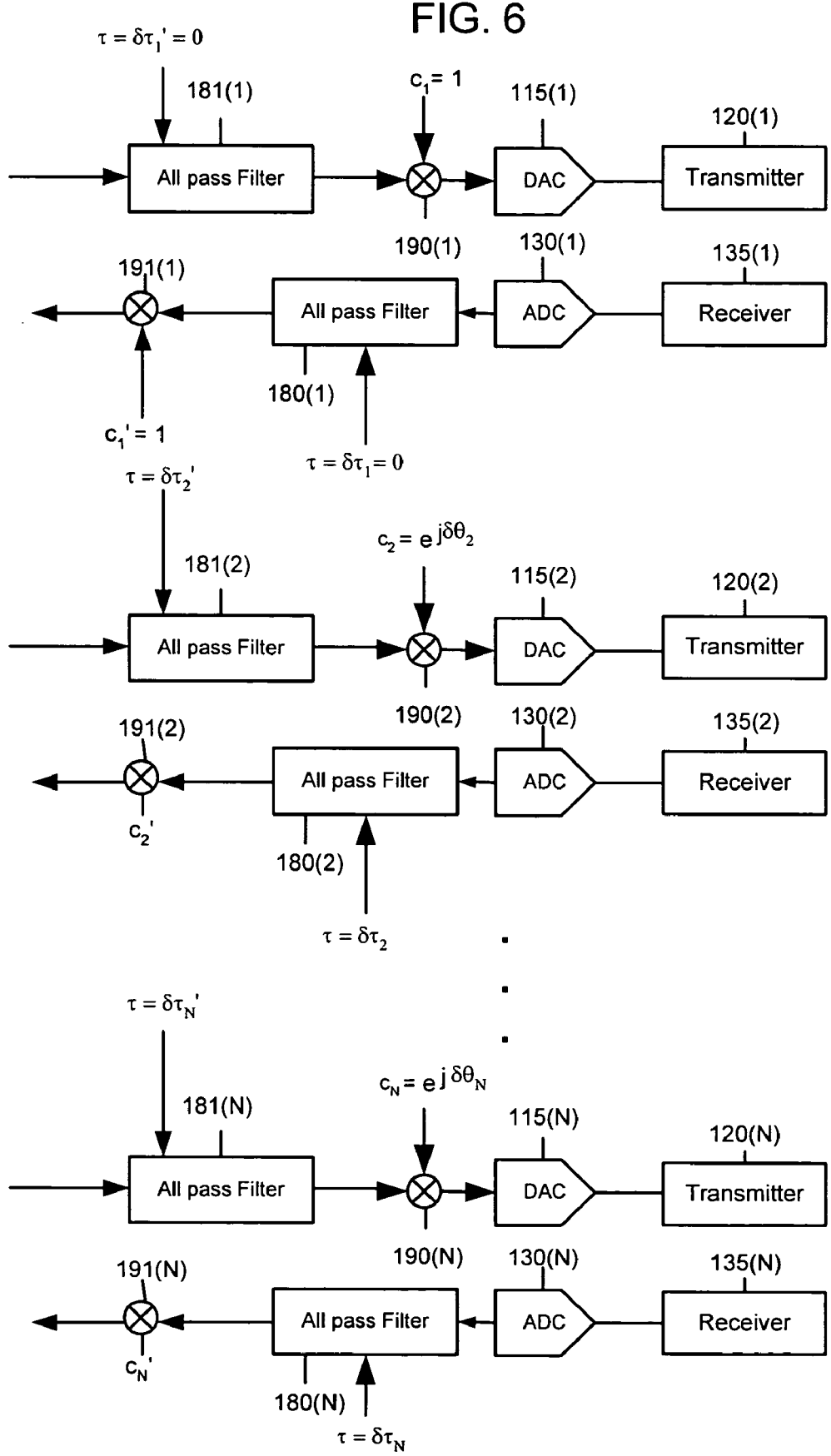
FIG. 6 is a block diagram showing how correction for offsets can be made in the receive path, transmit path, or both paths of a device.

With reference to FIG. 6, the offset correction values may be applied in the transmit path, receive path or both paths, of the modem. For example, when the offsets $c_1$ to $c_N$ are computed as described above in conjunction with FIG. 4 or 5, the correction can be made in the receiver path with multipliers 191 (i) where $c_i'$ is the inverse of $c_i$, or if amplitude correction is not performed, then $c_i'$ is the conjugate of $c_i$. Alternatively, the correction can be made in both the transmit paths and receiver paths such that the cumulative or net correction in the antenna paths is equal to the corresponding offset $c_i$ computed for that antenna path. Likewise, transmit all pass filters 181(i) (e.g., re-samplers) may be used instead of receive all pass filters where the values $\delta\tau_i$ are computed as described above in conjunction with FIG. 4, and $\delta\tau_i'$ is the inverse (delay instead of advance, or advance instead of delay) of $\delta\tau_i$. Alternatively, all pass filters may be used in the receive paths and transmit paths such that the cumulative or net correction in the antenna paths is equal to the corresponding group delay offset $\delta\tau_i$ computed for that path. The sequence of the multipliers and all pass filters in each receive and transmit baseband paths shown in FIG. 6 is not restrictive and can be switched.

Of all the sources of group delay mismatch in a MIMO transceiver, group delay differences among baseband components are the most troublesome because they cause relatively large frequency-dependent phase differences that vary within the bandwidth of the signal being transmitted. One way to remove the effect of baseband delay differences is to share the same lowpass filter (LPF) between the transmitter and receiver for each antenna path. This has the obvious additional benefit of saving silicon area.

Referring to FIG. 2, the group delay in the path from transmitter 1 to receiver i is $$\tau_{BBTX}(1)+\tau_{RFTX}(1)+\tau_{ant}(i)+\tau_{RFRX}(i)+\tau_{BBRX}(i)$$

and from transmitter i to receiver 1 is $$\tau_{BBTX}(i)+\tau_{RFTX}(i)+\tau_{ant}(i)+\tau_{RFRX}(1)+\tau_{BBRX}(1)$$

Figure 7:
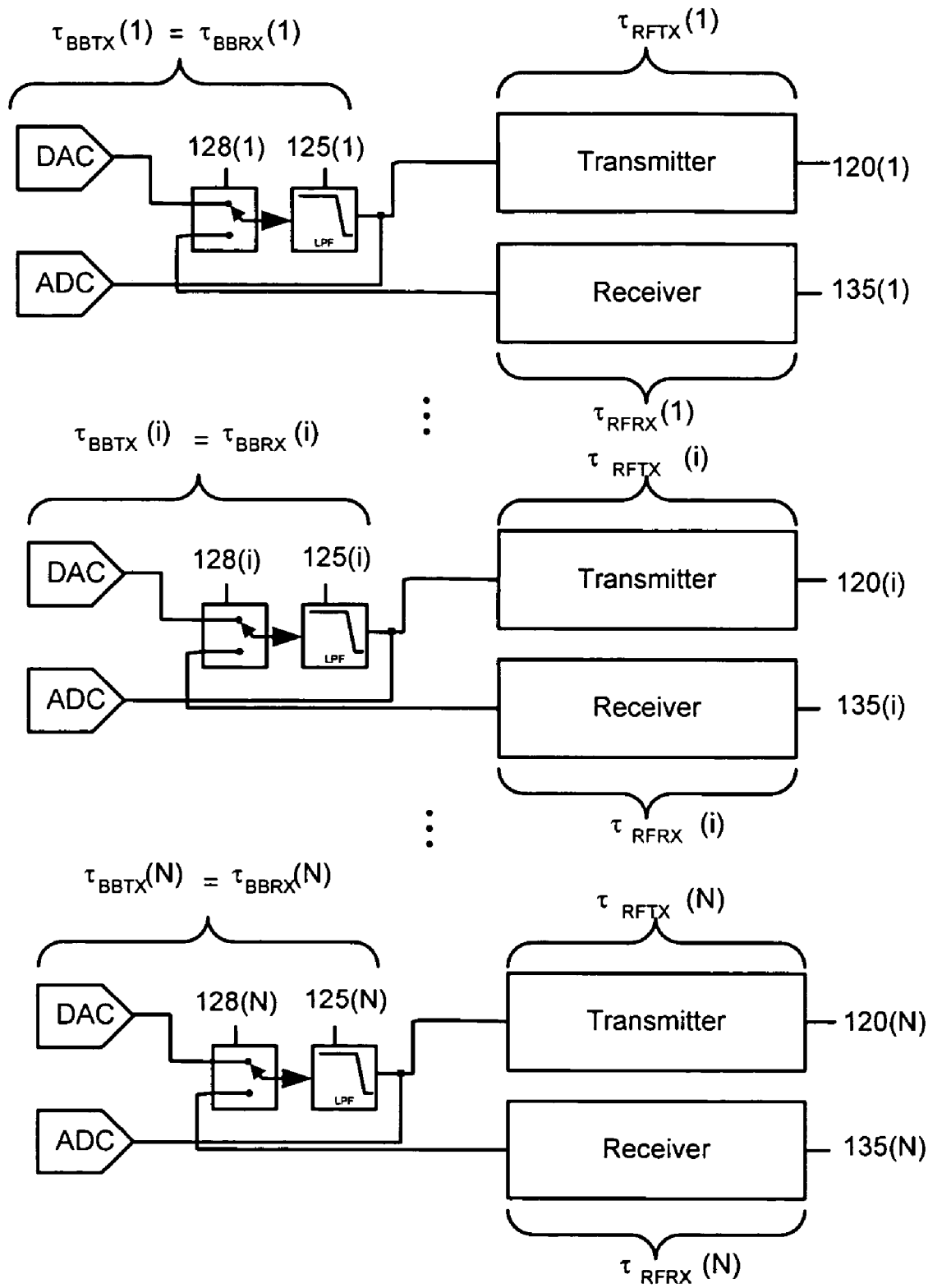
FIG. 7 is a block diagram showing how a low pass filter may be shared between transmit and receive paths to simplify correction or calibration.

If the same filter is shared for transmit and receive in each path, then $\tau_{BBTX}(1)=\tau_{BBRX}(1)$, $\tau_{BBTX}(i)=\tau_{BBRX}(i)$, and the difference in group delay between the two paths is $\tau_{RFTX}(1)+\tau_{RFRX}(i)-(\tau_{RFTX}(i)+\tau_{RFRX}(1))$, which depends only on RF components. Since the symmetry condition (equations 1 and 2) only depends on the phase offsets between these paths, the above analysis shows that if a shared LPF is used, channel symmetry will hold regardless of the group delay uncertainty of the LPF. FIG. 7 illustrates an example of filter sharing in which a switch 128(1) to 128(N) is provided that selects either the output of the DAC in the transmit path or the output of downconverter in the receive path as the input to the LPF in each radio transceiver.

These observations imply that there is no need to compensate for baseband group delay mismatch if the radio transceiver design shares an LPF for transmit and receive operations. In this case, only a single frequency non-selective (frequency independent) transmit phase alignment matrix is required for an OFDM scheme and no all pass group delay alignment is required for an OFDM or a single carrier scheme.

Another observation holds for the delay contributions of the ADC and the DAC, in which pipelining delay may cause relatively large group delay differences between transmit and receive paths. Since the total group delay in each transmit-to-receive loop-back path is the sum of the DAC and ADC group delays, the sum of these delays will be the same for all loop-back paths, and therefore the symmetry condition will hold regardless of group delay differences between these components (assuming all DACs and ADCs have the same group delay, which is typically the case).

Simulations were performed to determine the impact of phase and amplitude offsets (when not corrected) on a MIMO radio algorithm that relies on channel symmetry. The simulations used 200 random channels between 4 antennas at one device and 2 antennas at another device.

For each channel H, random mismatch matrices $A_1$, $B_1$, $A_2$, $B_2$ were generated, and the loss in link margin was computed. Both amplitude and phase mismatch were used for the transmit matrices $A_1$ and $A_2$. Only random phase mismatch was used for the receive matrices $B_1$ and $B_2$, since amplitude error in the receiver is presumably not a concern with some types of radio transceiver architectures. Amplitude mismatch $20\log(\alpha)$ was generated using a normal distribution with standard deviation $\sigma_\alpha$ dB. Phase mismatch $\theta$, $\phi$ was uniformly distributed between $-U_\theta/2$ and $U_\theta/2$ degrees. One set of mismatch matrices was generated for each value of $\sigma_\alpha$ in $\{1,2,3,6\}$ dB and for each value of $U_\theta$ in $\{10, 20, 45, 90, 180\}$ degrees. A total of 20 sets of 4 random mismatch matrices were generated for each random channel.

Figure 8:
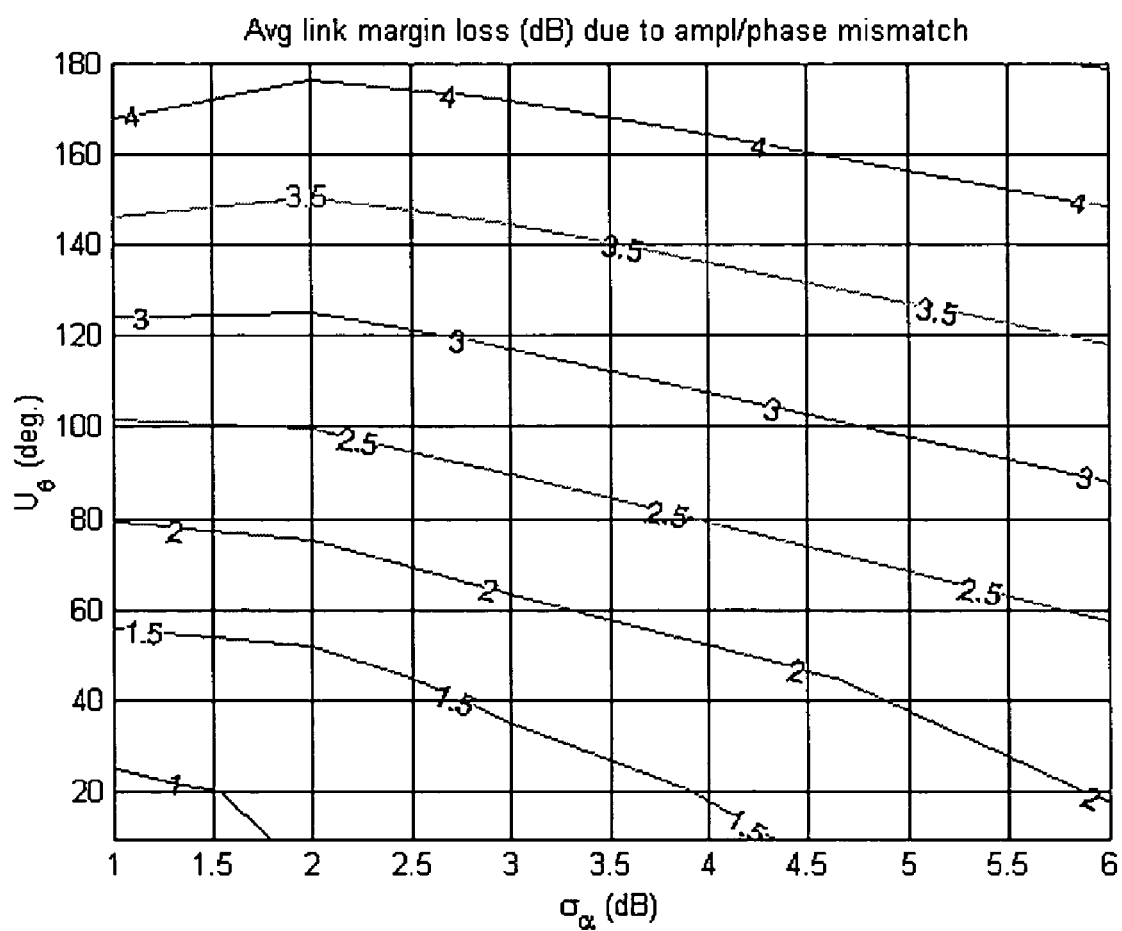
FIG. 8 is a contour plot that shows the average loss in link margin due to amplitude and phase offsets, when correction is not made.

FIG. 8 shows data plots for an equal-power CBF algorithm used between the two devices and shows, among other things, that equal-power CBF is significantly less sensitive to both phase and amplitude imbalance than non-equal power CBF, and also shows that amplitude offset correction is not necessary.

In sum, a radio device is provided comprising a plurality of transmitters that upconvert corresponding ones of a plurality of baseband transmit signals for simultaneous transmission via corresponding ones of a plurality of antennas; a plurality of receivers that downconvert a plurality of radio signals detected by corresponding ones of the plurality of antennas to produce a corresponding plurality of baseband receive signals; and a processor coupled to the plurality of transmitters and the plurality of receivers, wherein the processor processes the plurality of baseband transmit signals and/or the plurality of baseband receive signals with corresponding correction values that correct for differences in phase responses among the plurality of transmitters and plurality of receivers.

In addition, a method is provided for calibrating a radio device that comprises a plurality of antennas, a corresponding plurality of receivers and a corresponding plurality of transmitters, the method comprising steps of measuring phase responses of the plurality of transmitters and the plurality of receivers; and computing a plurality of correction values to correct for differences in the phase responses of the plurality of transmitters and the plurality of receivers.

Further, a method is provided for radio communication between a first radio device and a second radio device, the first radio device comprising a plurality of antennas, a corresponding plurality of transmitters and a corresponding plurality or receivers, the method at the first radio device comprising the step of processing a plurality of baseband transmit signals to be transmitted and/or baseband receive signals with corresponding correction values that correct for differences in phase responses of the plurality of transmitters and the plurality of receivers of the first radio device.

Further still, a method is provided for measuring characteristics of a radio device having a plurality of antennas, a corresponding plurality of transmitters and a corresponding plurality of receivers, comprising steps of coupling a signal to a first transmitter for transmission via a corresponding first antenna; and receiving the signal with a receiver associated with a second antenna.

Further still, a method is provided for calibrating a radio device that comprises a plurality of antennas, a corresponding plurality of receivers and a corresponding plurality of transmitters, the method comprising steps of: supplying a reference signal to an input of a receiver circuit associated with a first antenna path to enable the receive circuit to process the reference signal and produce a first baseband signal that is converted to a first digital signal by an analog-to-digital converter associated with the first antenna path; coupling the first digital signal to a digital-to-analog converter associated with a transmitter circuit of a second antenna path, wherein the transmitter circuit associated with the second antenna path outputs an analog signal; measuring the phase difference between the reference signal supplied to the input of the receiver circuit associated with the first antenna path and the analog signal output by the transmitter circuit associated with the second antenna path to produce a first phase difference; supplying a reference signal to an input of a receiver circuit associated with the second antenna path to enable the receiver circuit to process the reference signal and produce a second baseband signal that is converted to a second digital signal by an analog-to-digital converter associated with the second antenna path; coupling the second digital signal to a digital-to-analog converter associated with a transmitter circuit of the first antenna path, wherein the transmitter circuit associated with the first antenna path outputs an analog signal; measuring the phase difference between the reference signal supplied to the input of the receiver circuit associated with the second antenna path and the analog signal output by the transmitter circuit associated with the first antenna path to produce a second phase difference; and computing a phase mismatch value from the first phase difference and the second phase difference, whereby the phase mismatch value represents the phase mismatch between the first antenna path and the second antenna path and is used when processing baseband signals that are transmitted and/or received via the plurality of antenna paths.

The above description is intended by way of example only and is not intended to limit the present invention in any way.

What is claimed is:

1. A method for calibrating a radio device that comprises a plurality of antennas, a corresponding plurality of receivers and a corresponding plurality of transmitters, the method comprising steps of:

a. supplying a reference signal to an input of a receiver circuit associated with a first antenna path to enable the receive circuit to process the reference signal and produce a first baseband signal that is converted to a first digital signal by an analog-to-digital converter associated with the first antenna path;

b. coupling the first digital signal to a digital-to-analog converter associated with a transmitter circuit of a second antenna path, wherein the transmitter circuit associated with the second antenna path outputs an analog signal;

c. measuring the phase difference between the reference signal supplied to the input of the receiver circuit associated with the first antenna path and the analog signal output by the transmitter circuit associated with the second antenna path to produce a first phase difference;

d. supplying a reference signal to an input of a receiver circuit associated with the second antenna path to enable the receiver circuit to process the reference signal and produce a second baseband signal that is converted to a second digital signal by an analog-to-digital converter associated with the second antenna path;

e. coupling the second digital signal to a digital-to-analog converter associated with a transmitter circuit of the first antenna path, wherein the transmitter circuit associated with the first antenna path outputs an analog signal;

f. measuring the phase difference between the reference signal supplied to the input of the receiver circuit associated with the second antenna path and the analog signal output by the transmitter circuit associated with the first antenna path to produce a second phase difference; and g. computing a phase mismatch value from the first phase difference and the second phase difference, whereby the phase mismatch value represents the phase mismatch between the first antenna path and the second antenna path and is used when processing baseband signals that are transmitted and/or received via the plurality of antenna paths.

2. The method of claim 1, and further comprising repeating steps (a) through (g) to compute a phase mismatch value between the first antenna path and antenna path i, for i=3 to N, where N is the total number of antenna paths.

3. The method of claim 2, wherein the steps (a)–(h) are repeated when a reference signal is supplied at each of a plurality of frequencies within a bandwidth of a baseband signal.

4. The method of claim 3, wherein the steps (c) and (f) of measuring comprise measuring the phase difference at each of a plurality of sub-carriers of the multi-carrier reference signal.

5. The method of claim 1, wherein the steps (a) and (d) of supplying a reference signal comprise supplying a continuous wave reference signal.

6. The method of claim 1, wherein the steps (a) and (d) of supplying a reference signal comprise supplying a multi-carrier reference signal.

7. The method of claim 1, and further comprising the step of storing in a memory information to allow for adjustment of phase mismatch values according to gain settings of the plurality of transmitters and/or gain settings of the plurality of receivers.

* * * * *

UNITED STATES PATENT AND TRADEMARK OFFICE
CERTIFICATE OF CORRECTION

PATENT NO. : 7,236,750 B2
APPLICATION NO. : 10/859255
DATED : June 26, 2007
INVENTOR(S) : Vaidyanathan et al.

It is certified that error appears in the above-identified patent and that said Letters Patent is hereby corrected as shown below:

IN THE SPECIFICATION

At column 4, delete line 15, and insert therefor --$A_2=\text{diag}(\alpha_{21}e^{j\phi^{21}}, \ldots, \alpha_{2M}e^{j\theta 2M})$--.

At column 6, delete line 2, and insert therefor
--$\theta_{22}-\phi_{22})]=\ldots=\gamma_{2M}\alpha_{2M}/\beta_{2M}\exp[j(\Omega_{2M}+\theta_{2M}-\phi_{2M})]$,--.

At column 6, delete line 48 and insert therefor
--$[\Omega_1+\theta_1-\phi_1]=[\Omega_3+\theta_3-\phi_3]; \gamma_1\alpha_1/\beta_1=\gamma_3\alpha_3/\beta_3$--.

At column 9, line 4, after the words "defined as", delete "$\gamma_i\exp(j\Omega_i)$", and insert therefor --$\gamma_1\exp(j\Omega_i)$--.

At column 9, line 15, before the word "attractive", insert --be--.

At column 9, line 58, after the word "difference",
delete "$\psi_{21}(k)=[\theta_2(k)+\phi_1(k)+\phi\text{ant}(\mathbf{1,2})]$" and insert therefor
--$\psi_{21}(k)=[\theta_2(k)+\phi_1(k)+\phi_{\text{ant}}(\mathbf{1,2})]$--.

At column 10, delete line 4, and insert therefor --$\delta\tau_2= -(1/2\pi)*\text{slope of a best fit line through points}$--.

At column 10, line 16, after the word "offsets", delete "$\delta_{\tau i}$" and insert therefor --$\delta\tau_i$--.

UNITED STATES PATENT AND TRADEMARK OFFICE
CERTIFICATE OF CORRECTION

PATENT NO. : 7,236,750 B2
APPLICATION NO. : 10/859255
DATED : June 26, 2007
INVENTOR(S) : Vaidyanathan et al.

It is certified that error appears in the above-identified patent and that said Letters Patent is hereby corrected as shown below:

At column 12, line 63, before the word "baseband", delete the second instance of "plurality of".

Signed and Sealed this

Twenty Second Day of April, 2008

JON W. DUDAS
*Director of the United States Patent and Trademark Office*